March 17, 1970   W. L. ROOT 3RD, ETAL   3,500,901
MIXER
Filed Nov. 8, 1967   4 Sheets-Sheet 1
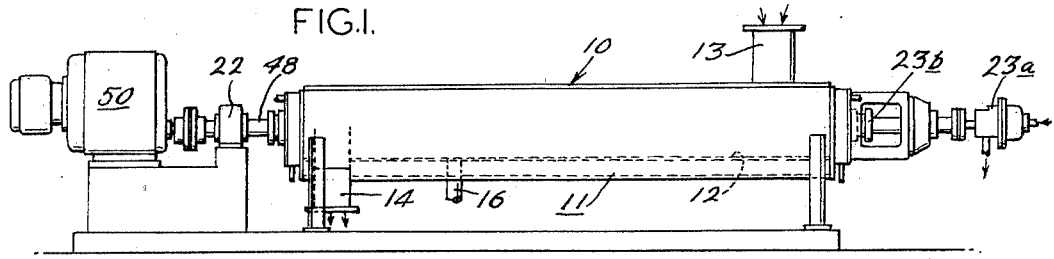
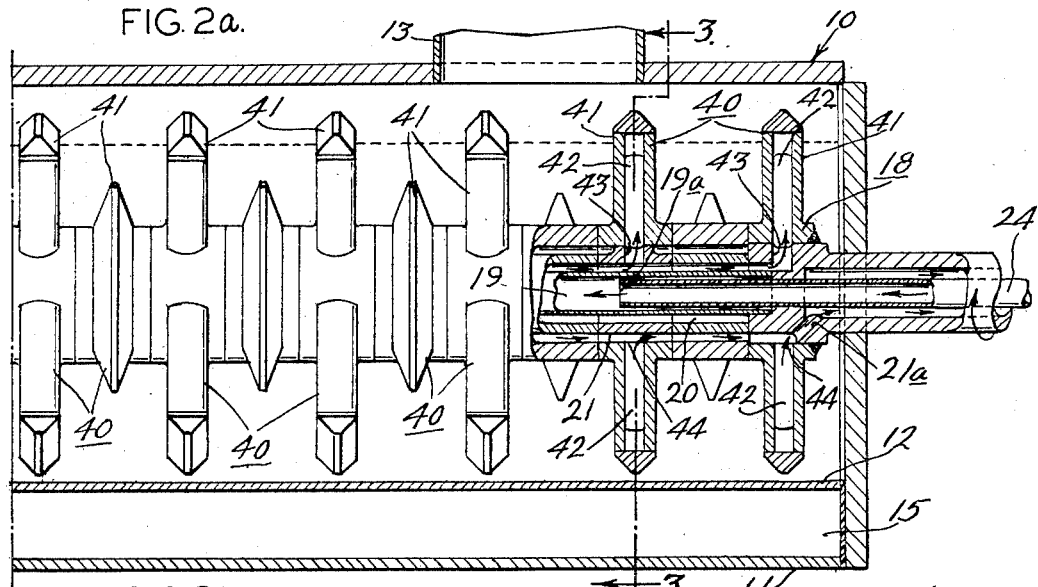
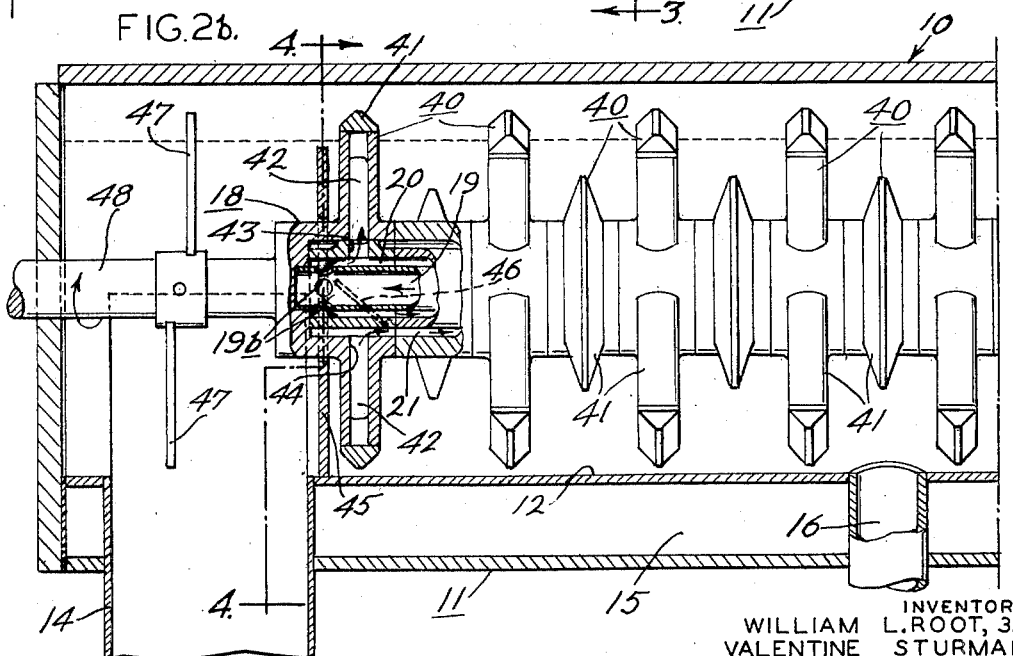
INVENTORS:
WILLIAM L. ROOT, 3rd.
VALENTINE STURMAN
MILTON S. MERY
BY Howson & Howson
ATTYS.

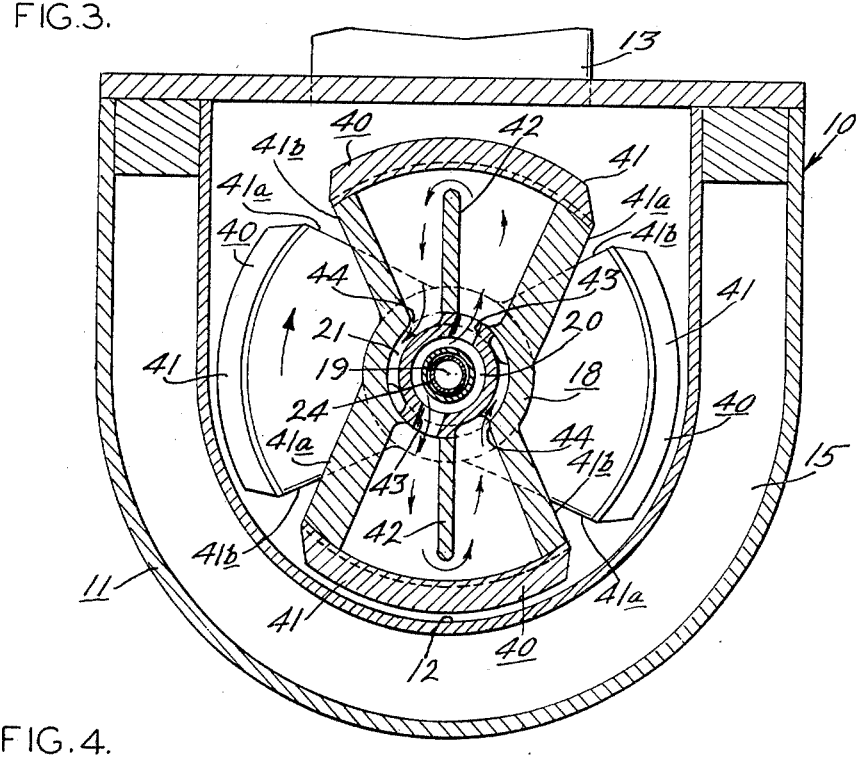

March 17, 1970 W. L. ROOT 3RD, ETAL 3,500,901
MIXER
Filed Nov. 8, 1967 4 Sheets-Sheet 3
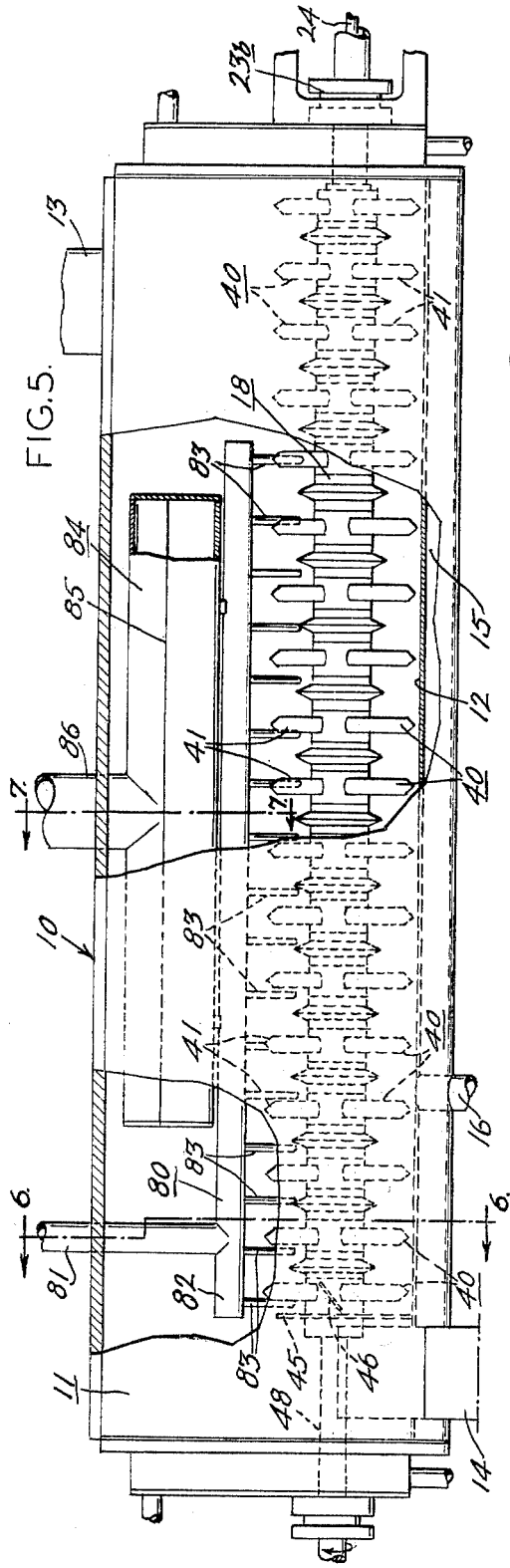
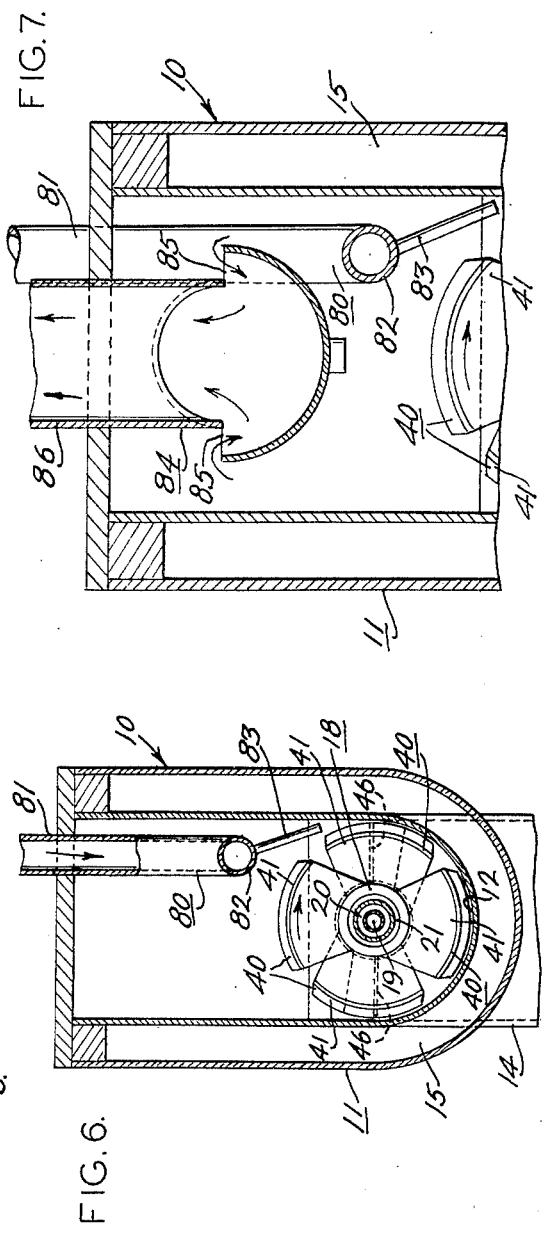
INVENTORS:
WILLIAM L. ROOT, 3rd.
VALENTINE STURMAN
MILTON S. MERY
BY Howson & Howson
ATTYS.

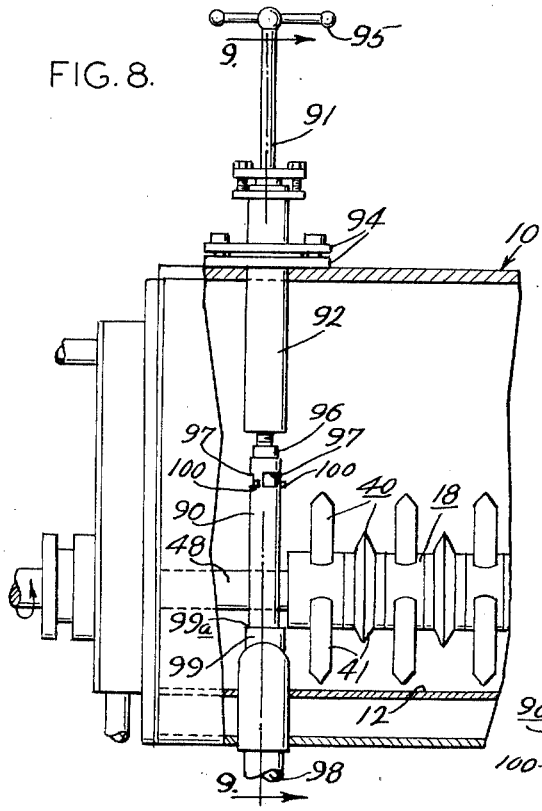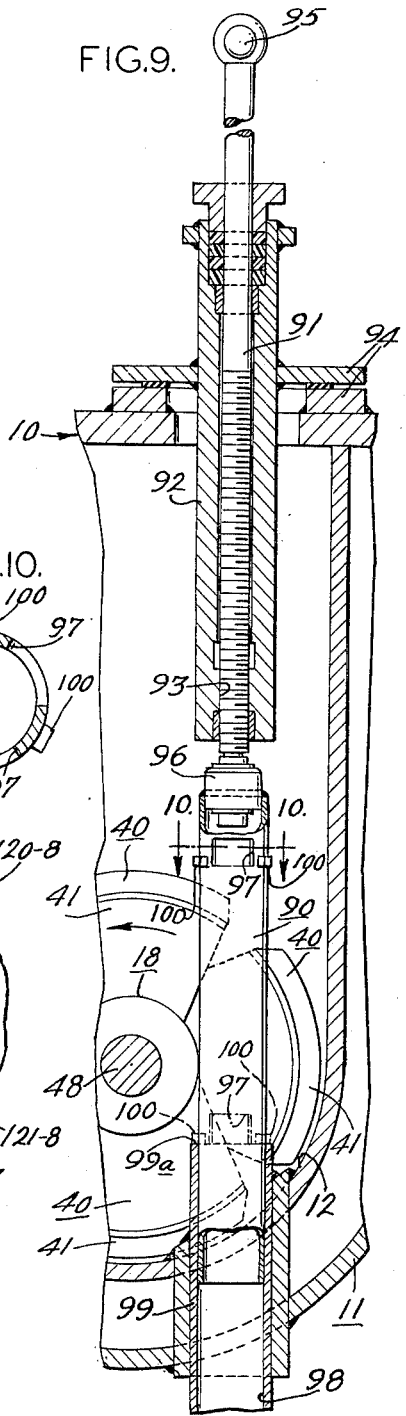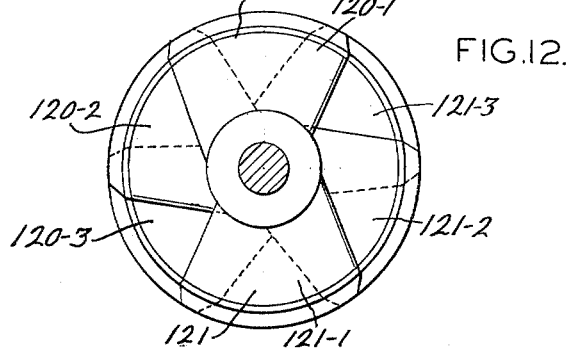

United States Patent Office 3,500,901
Patented Mar. 17, 1970

3,500,901
MIXER
William L. Root 3rd, Bethlehem, Valentine Sturman, Quakertown, and Milton S. Mery, Danielsville, Pa., assignors to The Bethlehem Corporation, Bethlehem, Pa., a corporation of Pennsylvania
Filed Nov. 8, 1967, Ser. No. 681,514
Int. Cl. F28d 11/00; F28f 5/00
U.S. Cl. 165—86                                           13 Claims

ABSTRACT OF THE DISCLOSURE

Apparatus for indirectly treating material including an elongated heat-exchanger-mixer having an inlet for charging the mixer with the material to be treated and an outlet for discharging the treated material therefrom. Interiorly of the mixer is means defining a hollow shaft assembly which extends longitudinally of the container and is rotatably supported therein. The hollow shaft assembly includes at least three axially extending fluid passageways, the first passageway having a heat transfer fluid inlet at one end thereof and an outlet at the other end thereof. The second passageway extends, in a manner similar to the first passageway, axially of the mixer and communicates with the outlet of the first passageway, while the third passageway is closed at one end and has a fluid outlet at the other end. Mounted about the shaft is a plurality of heat transfer and mixing assemblies, each comprising a radially extending, substantially hollow blade having fluid inlet means which are connected to the second passageway and in fluid communication therewith. In addition, each of the blades includes a fluid outlet which is connected to the third passageway so as to permit discharge of the fluid therefrom. Unlike other continuous mixers, where the blades are angulated in order to transport the material from the inlet to the outlet, each of the blades are permanently and fixedly connected to the hollow shaft assembly perpendicular to the longitudinal axis of the shaft assembly to thereby form a mixer between the inlet and the outlet. In addition, this patent discloses a novel purging device which injects, into a bed of material, a gas such as air adapted to purge the bed of entrained water, or vapor.

Summary of the invention

The present invention relates to mixing apparatus and more particularly to rotary mixing apparatus wherein heat is to be indirectly transferred either to or from, as the case may be, the material to be processed.

Although rotary mixing apparatus is old in the art, in recent years there has been a strong trend to incorporate within the mixing apparatus heat exchange means whereby heat may be added or removed from the material as it is being mixed. For example, the Root Patent #3,285,330 is illustrative of continuous mixing apparatus in which the material being treated is driven from the inlet to the outlet by the action of blades which are angularly set with respect to the shaft. It has been discovered that in certain instances and in the mixing of certain types of material, the residence time for a complete reaction to take place is insufficient unless the mixer is physically very long, or the speed of rotation of the mixing paddles or blades is reduced to the point that mixing is inefficient.

In view of the above it is a principal object of the present invention to provide rotary mixing apparatus wherein heat may be indirectly transferred either to or from the processed material.

Another object of the present invention is to provide a rotary mixer of the continuous type which is capable of mixing various granular and non-granular materials with a constant flow between the input and output but in which the residence time of the material in the mixer may be increased while still obtaining good heat transfer and intimate mixing of the material.

Another object of the present invention is to provide apparatus for purging water and vapor entrained in mixes and including a vent particularly adapted to remove the vapor from the mixer without loss of particles from the bed of material.

Still another object of the present invention is to provide an adjustable weir discharge device which may be utilized to adjust for variations in residence time of material within the mixer.

Other objects and a fuller understanding of the invention may be had by referring to the following specification and claims taken in conjunction with the accompanying drawings in which:

FIG. 1 is a schematic profile of apparatus embodying the present invention;

FIG. 2a is an enlarged fragmentary sectional view of a portion of the apparatus illustrated in FIG. 1;

FIG. 2b is a fragmentary sectional view of another portion of the apparatus illustrated in FIG. 1 and constructed in accordance with the present invention;

FIG. 3 is a sectional view taken along line 3—3 of FIG. 2a;

FIG. 4 is a sectional view taken along line 4—4 of FIG. 2b;

FIG. 5 is a fragmentary side elevational view, schematic in nature, of a mixer of the present invention illustrating means for purging a slurry of entrapped gases;

FIG. 6 is an enlarged fragmentary sectional view taken along line 6—6 of FIG. 5;

FIG. 7 is an enlarged fragmentary sectional view taken along line 7—7 of FIG. 5;

FIG. 8 is a fragmentary side elevational view of a portion of the apparatus of the present invention and showing an adjustable weir particularly adapted for use with slurries or liquids in the mixer of the present invention;

FIG. 9 is an enlarged fragmentary sectional view taken along line 9—9 of FIG. 8;

FIG. 10 is an enlarged sectional view taken along line 10—10 of FIG. 9;

FIG. 11 is a fragmentary side elevational view of another embodiment of blades for the mixer of the present invention and wherein it is desired to cause more rapid movement of the material from the inlet to the outlet; and FIG. 12 is an end elevational view taken along line 12—12 of FIG. 11.

Referring now to the drawings and especially FIGS. 1–4, a longitudinally extending heat exchanger-mixer 10 includes a trough or casing 11, the lower inner surface 12 of which is preferably semi-cylindrical or arcuate and extends the entire length of the apparatus. A charging inlet 13 is provided at one end of the trough 11, in the present instance the upper portion thereof, and a discharge outlet 14 is provided at the other end of the apparatus, preferably in the lower portion of the trough when the device is mounted with its axis in a horizontal position. As shown in FIGS. 1–4, the mixer 10 may be jacketed as at 15 to provide additional heat transfer area and include, as shown in FIGS. 1 and 2b, a clearout drain 16. The charging inlet and discharging outlet 13 and 14 respectively may be connected to conduits or other structures for bringing material to be treated to the heat exchanger-mixer 10 and for conveying it therefrom following the mixing and heat exchange process.

Rotatably mounted within the heat exchanger-mixer 10 and extending longitudinally of the trough 11 is a hollow aft assembly 18 comprising an axially extending first fluid passage means 19 having a heat transfer fluid inlet 19a one end thereof and an outlet 19b, in the present instance including a plurality of circumferentially spaced art apertures, at the other end thereof. As illustrated st in FIGS. 2–4, means defining a second passage 20 tends axially of the trough 11 and communicates with e outlet of the first passage, the purpose of the second ssage 20 will be more fully explained hereinafter. Circumscribing the second passage 20 and extending axially the trough 11 is means defining a third passage 21 having an outlet 21a (see FIG. 2a) at the end of the hollow aft assembly 18 adjacent the inlet 19a associated with e first passage. As will be more fully explained hereafter, fluid communication between the third passage 21 d the second passage 20 is through a plurality of heat ansfer assemblies 40 which are disposed at intervals ong the hollow shaft assembly 18, intermediate the int 13 and the discharge outlet 14 as shown in FIG. 1, e hollow shaft assembly 18 is supported at one end by bearing 22 and at the other end by a rotary coupling a and a bearing 23b Drive means 50 is connected rough the bearing 22 to a shaft extension 48 connected the shaft assembly 18, to effect rotation to the shaft sembly. The rotary coupling 23a and bearing 23b are ovided for fluid communication with the interior of the llow shaft assembly 18, particularly the first passage 19 d the third passage 21, through the outlet 21a and an ternally projecting conduit 24 which extends into the let 19a of the first passage means 19.

In accordance with the invention, the heat transfer assemblies 40 are disposed along the shaft assembly 18 in aced substantially parallel relation, projecting radially tward and extending circumferentially of the shaft assembly in a plane substantially perpendicular to the longidinal axis of the assembly to thereby inhibit rapid movement of the material between the inlet and the outlet, hile permitting limited flow of the material. To this end, ch of the heat transfer assemblies 40 includes a hollow ade or paddle 41 having a vane or partition 42 therein, d a fluid heat exchange medium inlet 43 and outlet 44 ee FIG. 3).

As shown best in FIG. 3, the inlet 43 is in fluid communication with the second passage 20, while the outlet of each blade is in fluid communication with the third ssage 21 of the shaft assembly. As the vane or partition extends laterally across the blade 41 (see FIG. 2a,) id communication between the inlet 43 and the outlet is of necessity over the vane or partion to the outlet . In order to afford better mixing action as well as increased heat transfer area, and as best shown in FIGS. 3 d 4, the blades 41 are fan-shaped in side elevation, the ding and trailing edges 41a and 41b of the blades having any desired configuration, in the present instance and best shown in FIGS 2a and 2b slightly arcuate. It has en discovered that it is necessary to inject the fluid heat nsfer medium at the opposite end from the inlet, by y of the first passage 19, in order to prevent air binding and in the blades of the heat transfer assemblies.

As material is placed in the mixer at the charging inlet, d mixing occurs due to rotation of the shaft assembly , means are provided adjacent the discharge outlet for mpensating for differences in bulk density caused by rinkage of the material as it proceeds from the inlet to e outlet. To this end, a weir 45 extends across the trough adjacent the discharge outlet 14, and substantially perndicular to the shaft assembly 18. By positioning the ir with respect to the discharge adjacent the outlet 14, material being processed builds-up and forms a contiuously agitated bed of material throughout the mixer in at exchange relationship with the heat transfer fluid in e blades 41. Despite the non-angularity of the blades 41 th respect to the shaft assembly 18, material flows from charging inlet to the discharge outlet 14 where a pair radially extending angulated flinger paddles or lifting ades 46 are mounted adjacent the weir 45 whereby, upon rotation of the shaft, the paddles 46 tend to lift material from the bed and fling the material over the top of the weir.

As shown in FIG. 2b, in order to reduce bridging of the material across the discharge outlet 14, radially extending break-up blades or paddles 47 are mounted on a shaft extension 48 for rotation with the shaft. In this manner, material which tends to clog the discharge outlet is broken-up by the action of the rotating paddles 47.

With the construction shown in FIGS. 1–4, material progresses from the inlet 13 to the outlet 14 despite the lack of angularity of the blades 41. In a construction of this type the apparent reason for flow of material from the inlet to the outlet is solely related to the quantity of material being removed at any one time by the flinger blades or paddles 46, and thus the residence time of material in the mixer 10 may be increased solely by speeding up or slowing down the rotation of the hollow shaft assembly especially as the blades of the heat transfer assembly 40 are offset angularly 90° from adjacent blades. In addition, it has been found that increasing or decreasing the speed of rotation of the shaft assembly, within limits, while effecting output, does not deleteriously effect mixing.

In certain instances where the material to be discharged will be in a solid, granular, or liquid condition, for example a molten condition such as in the preparation of an epoxy curing agent wherein the feed stock is a solid which is melted and reacted to give a curing agent, it is necessary to sweep the fluid bed with an inert gas which serves as the stripping agent for water moisture which must be removed in order to complete the reaction. To this end, a mixer 10 similar to that which has already been described, and thus like parts bear like numbers, is shown in FIGS. 5–7, and includes novel purging means for cleaning or removing water or vapor entrained in the material interiorly of the mixer 10. As shown in FIGS. 5–7, the apparatus 80 includes an inert gas inlet pipe 81 connected to a header 82 having a plurality of depending nozzles 83 which project downwardly below the upper surface of the material contained in the mixer 10. In this manner, inert gas entering the inlet pipe 81 will flow through the header 82 and be expelled from the nozzles 83 below the upper level of the material causing a purging action of the material as the shaft assembly 18 rotates. Water or other estrained vapor will be removed from the mix in the form of vapor carried by the gas, the vapor rising in the mixer and entering a knock-out drum 84 having a gas inlet 85 and a gas outlet 86. The gas outlet 86 may be connected to suitable cleaning means for permitting recirculation of the gas, the path between the inlet 85 and the outlet 86 being deliberately tortuous for eliminating mist from the vapor before it leaves the mixer shell. With certain mixes it may be unnecessary to use an inert gas and the apparatus above described may be easily used with air as the gaseous medium, the air may or may not be specially treated to remove moisture therefrom.

In certain instances, it may be desirable, especially with slurry or molten type mixes to provide a different weir arrangement than that heretofore described in order to facilitate adjustment of the material bed level, and to permit unloading of the mixer 10 upon attaining the desired quantity of material being mixed. A suitable weir arrangement is shown in FIGS. 8–10, replacing the weir 45 and the outlet 14. (It should be noted, as before, that like parts are given like numbers.) To this end, an adjustable weir may be provided comprising a pipe 90 connected to a threaded shaft 91 which is mounted for rotation in a sleeve 92 having coacting threads as at 93. As shown in FIG. 8, the sleeve 92 is connected to the mixer 10 as by flanges 94, the sleeve projecting inwardly into the mixer. The shaft 91 is connected to a handle 95 exteriorly of the mixer, which handle permits raising and lowering of the shaft by rotation thereof. As best shown in FIGS. 8–10, the pipe 90 is connected to the shaft 91 as by a rotatable joint 96, the pipe having a plurality of circumferentially spaced entry apertures 97 to permit material to flow into the pipe and out a discharge outlet 98. Projecting through the lower inner surface 12 of the trough 11 is a tube 99, in the present instance the tube 99 being adapted for coaxial circumscribing sliding engagement with the pipe 90. Adjacent the inlet apertures 97 are radially projecting stop or lug means 100 which engage, upon the pipe 90 being lowered into the dotted line position shown in FIG. 9, with the terminal end 99a of the tube 99. In this manner, the pipe 90 may be adjusted to any desired level to permit variations in the depth of the bed of material in the mixer, and to increase or decrease the flow from the mixer.

Where the material is of a type which is difficult to mix without the material packing, or roping, a modification of the blades is necessary. In addition, it has been discovered that despite the non-angularity of the blades, if the blades arranged such that they are circumferentially and axially spaced in circumferential overlapping relation so that the imaginary line connecting the centers of the tips of the blades form a helix about the shaft assembly, movement of the material between the inlet and outlet occurs. In the embodiment shown in FIGS. 11 and 12, it is theorized that the helical array of the tips of the blades, despite their orientation in a plane perpendicular to the longitudinal axis of the shaft assembly, cooperates with the material which temporarily bridges between the blades to form a helical screw which causes feeding of the material from the inlet to the outlet.

Referring now to FIGS. 11 and 12, two sets of blades 120 and 121 respectively are shown therein, each of the blades being angularly and axially spaced in circumferential overlapping relation with the next succeeding blade of its set, the centers of the tips of each set of blades forming a helix. As shown in FIG. 11, blades of the set 120 have been designated 120–1, 120–2, 120–3, 120–4, 120–5, 120–6, 120–7, and 120–8; while the blades of the set 121 have been designated 121–1, 121–2, 121–3, 121–4, 121–5, 121–6, 121–7, and 121–8. As shown in FIG. 12, the helixes are offset 180° from each other, the blades which are aligned being designated as by their appropriate numbers. It should be recognized that internally, each of the blades is identical to the blades heretofore described with reference to FIGS. 3 and 4.

Thus the apparatus of the present invention provides a continuous mixer which permits material flow from the inlet to the outlet despite the position of the blades, i.e. their being perpendicular to the longitudinal axis of the shaft assembly. In addition, novel purging apparatus for eliminating entrapped vapors and water from mixes is provided, the purging apparatus being such as to permit entry of gaseous medium into the bed of material to thus drive out water, entrapped vapors and the like. In addition, novel adjustable weir apparatus is provided which permits changes in bed level without deleteriously effecting the mixing action while permitting adjustment of residence time within the mixer. Furthermore, in instances where an increased flow is desired between the inlet and outlet, and it is not desired to angulate the blades with respect to a plane perpendicular to the longitudinal axis of the shaft, a double set of blades is provided wherein the blades are angularly and axially spaced in circumferential overlapping relation so that their tips form a double helix.

Thus although the invention has been described with a certain degree of particularity, it should be understood that the present disclosure is only exemplary of the invention, and that numerous changes in the details of construction, and the combination and arrangement of parts may be made without departing from the spirit and the scope of the invention as hereinafter claimed.

What is claimed is:

1. A continuous heat exchanger-mixer for indirectly treating material comprising an elongated trough having an inlet at one end for charging the trough with material to be treated and an outlet at the opposite end for discharging treated material from said trough; weir means cooperable with said outlet to effect retention of said material within said trough to form a bed; means defining a hollow shaft assembly extending longitudinally of said trough and rotatably supported therein; said hollow shaft assembly including axially-extending fluid passage means having heat transfer fluid intake and exhaust means; a plurality of heat transfer and mixing assemblies, each comprising a radially-projecting substantially hollow blade having vane means defining passages in fluid communication with individual fluid inlet means and fluid outlet means connected to said passage means; each of said blades comprising a substantially-flat sector-shaped element of limited circumferential extent permanently and fixedly connected to and spaced alternately and equidistantly along said hollow shaft assembly, and extending circumferentially of the shaft assembly within a plane substantially perpendicular to the longitudinal axis of said shaft assembly; and means to rotate said shaft assembly to rotate said blades through the bed of material retained in said trough to form a mixer between said inlet and said outlet, the rotation of said blade cooperating with said weir means to advance the material in said bed through said trough from said inlet to said outlet.

2. Apparatus according to claim 1 wherein said intake and exhaust means of said fluid passage means are both positioned at one of the ends of said hollow shaft assembly, said passage means comprising a first conduit extending from said fluid intake means to the other of the ends of said assembly to transfer the heat transfer fluid thereto, a second conduit extending axially of said trough from said other end and communicating with said first conduit at said other end, and with each of the fluid inlet means of said hollow blades and a third conduit extending axially of said assembly connected at one end to said fluid exhaust means for communicating with the fluid outlet means of each of said hollow blades whereby the heat transfer fluid in each hollow blade flows out toward said one end.

3. A heat exchanger-mixer in accordance with claim 1 wherein said weir means comprises a plate extending transversely of said trough and positioned adjacent said discharge outlet; and at least one lifting blade means adjacent said weir for lifting material over said weir into said discharge outlet.

4. A heat exchanger-mixer in accordance with claim 3 including at least one radially projecting break-up blade mounted on said shaft assembly overlying said discharge outlet to break-up and prevent bridging of material at said outlet.

5. A heat exchanger-mixer in accordance with claim 1 wherein said discharge outlet and weir means includes a tube projecting upwardly into said trough, a pipe adapted for sliding coaxial engagement with said tube, said pipe having at least one aperture therein for permitting material entry into said pipe and out said tube; and means for raising and lowering said pipe relative to said tube.

6. A heat exchanger-mixer in accordance with claim 1 wherein adjacent blades are axially and circumferentially spaced one from the other, the circumferential spacing being approximately 90°.

7. A heat exchanger-mixer in accordance with claim 1 including at least one set of blades, adjacent blades of said set being spaced axially and angularly offset circumferentially in circumferential overlapping relation, the axial spacing and circumferential offsetting of said blades cooperating with the material in said bed in the trough to effect transfer of said material from said inlet toward said outlets.

8. A heat exchanger-mixer in accordance with claim 7 including a second set of blades, wherein the tips of the blades of each set are arranged in a helix, the helix of one set being offset 180 degrees from the helix of the other.

9. A heat exchanger-mixer in accordance with claim 8 wherein corresponding blades of the two sets are symmetrical about the same perpendicular plane and the circumferential spacing between the leading and trailing edges of said corresponding blades is at least as great as the axial spacing between adjacent blades in each set.

10. A heat exchanger-mixer in accordance with claim including purging means, said purging means including a plurality of nozzles adapted for projection into a bed of material in said mixer and supplying a gaseous medium thereto; and vent means mounted in said mixer for removing said gaseous medium therefrom.

11. A heat exchanger-mixer in accordance with claim wherein said means for raising and lowering said pipe relative to said tube includes a sleeve extending into said trough, a shaft extending through said sleeve, said shaft connected to said pipe, and means for permitting relative movement between said shaft and said sleeve to effect raising and lowering of said pipe relative to said tube.

12. A heat exchanger-mixer in accordance with claim 1 including stop means on said pipe to limit the travel of said pipe relative to said tube.

13. A continuous heat exchanger-mixer for indirectly heating material comprising an elongated trough having an inlet at one end for charging the trough with material to be treated and an outlet at the opposite end for discharging treated material from said trough; weir means cooperable with said outlet to effect retention of said material within said trough to form a bed; means defining a hollow shaft assembly extending longitudinally of said trough and rotatably supported therein; said hollow shaft assembly including axially-extending fluid passage means having heat transfer fluid intake and exhaust means; a plurality of heat transfer and mixing assemblies, each comprising at least one set of radially-projecting substantially hollow blades having individual fluid inlet means and fluid outlet means connected to said passage means and in fluid communication therewith; adjacent blades of said set being spaced axially and angularly offset circumferentially in circumferential overlapping relation along the longitudinal extent of said shaft, the axial spacing and circumferential offsetting of said blades cooperating with the material in said bed in the trough to effect transfer of said material from said inlet toward said outlets, each of said blades comprising a substantially-flat sector-shaped element of limited circumferential extent permanently and fixedly connected to said hollow shaft assembly, and extending circumferentially of the shaft assembly within a plane substantially perpendicular to the longitudinal axis of said shaft assembly; and means to rotate said shaft assembly to rotate said blades through the bed of material retained in said trough to form a mixer between said inlet and said outlet, the rotation of said blade cooperating with said weir means to advance the material in said bed through said trough from said inlet to said outlet.

References Cited
UNITED STATES PATENTS

| | | | |
|---|---|---|---|
| 1,689,189 | 10/1928 | Broadhurst | 165—92 |
| 3,020,025 | 2/1962 | O'Mara | 165—87 |
| 2,793,006 | 5/1957 | Eaby | 165—89 |
| 3,263,748 | 8/1966 | Jemal et al. | 165—87 |
| 3,285,330 | 11/1966 | Root | 165—86 |

ROBERT A. O'LEARY, Primary Examiner

T. W. STREULE, Assistant Examiner